United States Patent
Fan et al.

(10) Patent No.: US 9,357,347 B2
(45) Date of Patent: May 31, 2016

(54) METHOD AND SYSTEM FOR AGGREGATING MESSAGES BASED ON A POINT OF INTEREST AND STORAGE MEDIUM

(71) Applicant: Tencent Technology (Shenzhen) Company Limited, Shenzhen City, Guangdong (CN)

(72) Inventors: Huaheng Fan, Shenzhen (CN); Yuanfang Lv, Shenzhen (CN); Sheng Cao, Shenzhen (CN); Wei Wu, Shenzhen (CN); Wei Liu, Shenzhen (CN); Ziming Wang, Shenzhen (CN); Jun Zhang, Shenzhen (CN); Qiong Wang, Shenzhen (CN); Mengguang Lin, Shenzhen (CN); Yuxiang Fan, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 14/604,697

(22) Filed: Jan. 24, 2015

(65) Prior Publication Data
US 2015/0264524 A1      Sep. 17, 2015

Related U.S. Application Data

(63) Continuation of application No. PCT/CN2013/080111, filed on Jul. 25, 2013.

(30) Foreign Application Priority Data

Jul. 25, 2012   (CN) .......................... 2012 1 0259577

(51) Int. Cl.
*H04W 4/02* (2009.01)
*H04L 12/58* (2006.01)

(52) U.S. Cl.
CPC .............. *H04W 4/021* (2013.01); *H04L 51/32* (2013.01)

(58) Field of Classification Search
CPC ........ H04W 4/021; H04W 4/02; H04L 51/32; G06K 9/00624; G06F 17/30386; G01S 5/0252; G06Q 30/0623

USPC ............ 455/456.3, 456.1, 457; 345/636, 667; 705/26.61

See application file for complete search history.

(56) References Cited

U.S. PATENT DOCUMENTS

| | | | |
|---|---|---|---|
| 2008/0070588 A1 | 3/2008 | Morin | |
| 2013/0147842 A1* | 6/2013 | Zhu ...................... | G09G 5/373 345/636 |
| 2013/0317944 A1* | 11/2013 | Huang .................. | G01S 5/0252 705/26.61 |

FOREIGN PATENT DOCUMENTS

| | | |
|---|---|---|
| CN | 101529834 A | 9/2009 |
| CN | 102147903 A | 8/2011 |
| CN | 102413065 A | 4/2012 |
| CN | 102576064 A | 7/2012 |
| WO | WO2012034525 A1 | 3/2012 |

OTHER PUBLICATIONS

International Searching Authority, The State Intellectual Property Office, Form PCT/ISA/210 for IA Application No. PCT/CN2013/080111, International Search Report (English translation), Nov. 7, 2013.

Australia Intellectual Property Office, Patent Examination Report No. 1, Application No. 2013295890, Jul. 20, 2015, pp. 1-4, Australia.

(Continued)

*Primary Examiner* — Phuoc H Doan
(74) *Attorney, Agent, or Firm* — BrainSpark Associates, LLC

(57) ABSTRACT

A method for aggregating messages based on a point of interest is provided, the method including: acquiring an instruction to trigger a point of interest; acquiring a region unit in which the point of interest is located from an electronic map which is divided into a plurality of region units in advance, and acquiring a predetermined number of region units including the region unit in which the point of interest is located by taking the region unit in which the point of interest is located as a center; acquiring messages issued within the predetermined number of region units; and generating a message aggregating page including a map indicative of the point of interest based on the acquired messages and displaying the acquired messages on the message aggregating page. A system for aggregating messages based on a point of interest is also provided.

20 Claims, 9 Drawing Sheets

(56) References Cited

OTHER PUBLICATIONS

State Intellectual Property Office of the People's Republic of China, Search Report and First Office Action (with English Translation of relevant sections), Application No. 2012102595775, pp. 1-6, China.

Australia Intellectual Property Office, Patent Examination Report No. 2, Application No. 2013295890, Oct. 30, 2015, pp. 1-3, Australia.
Canadian Intellectual Property Office, Office Action Report, Application No. 2879917, Feb. 8, 2016, pp. 1-3, Canada.

\* cited by examiner

METHOD AND SYSTEM FOR AGGREGATING MESSAGES BASED ON A POINT OF INTEREST AND STORAGE MEDIUM

This application is a U.S. continuation application under 35 U.S.C. §111(a) claiming priority under 35 U.S.C. §§120 and 365(c) to International Application PCT/CN2013/080111 filed on Jul. 25, 2013, which claims priority benefit of Chinese patent application No. 201210259577.5 filed by the applicant "Tencent Technology (Shenzhen) Company Limited" on Jul. 25, 2012 and entitled "METHOD AND SYSTEM FOR AGGREGATING MESSAGES BASED ON A POINT OF INTEREST", the contents of which are incorporated by reference herein in their entirety for all intended purposes.

FIELD OF THE INVENTION

The disclosure relates to Internet communication field, and particularly, to a method and system for aggregating messages based on a Point of Interest (POI).

BACKGROUND

Micro blog is a platform for message sharing, propagation and acquisition based on user relationships. A user can create a personal community via WEB, WAP and various client terminals to instantly update messages by words and share the messages.

The popularity of the micro blog on Internet makes messages being propagated quicker and more influential. A present micro blog allows the user to upload information about a point of interest at the same time of issuing a message, wherein the information about the point of interest is for example, an address, a name, a telephone number, and/or an appearance picture of the point of interest or only a part of an electronic map containing the point of interest. However, if another user wants to further learn about the point of interest, for example, other micro blog messages about the point of interest, users at the point of interest, a local distance to the point of interest and so on, the present micro blog fails to provide a corresponding entry.

SUMMARY OF THE INVENTION

The disclosure is directed to solve a technical problem that traditional micro blog products lack an adequate capability of aggregating messages based on a point of interest, and thus enlarge the message capacity of a micro blog and expand functions of the micro blog.

An embodiment of the disclosure provides a method for aggregating messages based on a point of interest, including: acquiring an instruction to trigger a point of interest; acquiring a region unit in which the point of interest is located from an electronic map which is divided into a plurality of region units in advance, and acquiring a predetermined number of region units including the region unit in which the point of interest is located by taking the region unit in which the point of interest is located as a center; acquiring messages issued within the predetermined number of region units; and generating a message aggregating page including a map indicative of the point of interest based on the acquired messages and displaying the acquired messages on the message aggregating page.

An embodiment of the disclosure further provides a system for aggregating messages based on a point of interest, including: an instruction acquiring module configured to acquire an instruction to trigger a point of interest; a unit acquiring module configured to acquire a region unit in which the point of interest is located from an electronic map which is divided into a plurality of region units in advance, and acquire a predetermined number of region units including the region unit in which the point of interest is located by taking the region unit in which the point of interest is located as a center; a message acquiring module configured to acquire messages issued within the predetermined number of region units; and a page generating and displaying module configured to generate a message aggregating page including a map indicative of the point of interest based on the acquired messages and displaying the acquired messages on the message aggregating page.

The method and system for aggregating messages based on a point of interest provided by the disclosure can enter the message aggregating page by triggering the point of interest, acquire more messages from neighborhoods of the point of interest, and further enlarge the message capacity of the micro blog and expand the functions of the micro blog.

DETAILED DESCRIPTION

In order to further illustrate technical means and functions employed by the disclosure, a method and system for aggregating messages based on a point of interest provided in the disclosure and specific implementations, processes, steps, structures, characteristics and functions thereof are described in detail below in combination with accompany drawings and prefer embodiments.

The above and other technical contents, characteristics and functions of the disclosure will become apparent from the following specific descriptions of the prefer embodiments referring to the accompany drawings. The technical means and functions employed by the disclosure can be further learned from the specific implementations. However, the accompany drawings are merely for reference and illustration, and are not intended to limit the disclosure.

The method and system for aggregating messages based on a point of interest provided by the disclosure can enter a message aggregating page by triggering a point of interest, acquire more messages from neighborhoods of the point of interest, and thus further enlarge the message capacity of a micro blog and expand functions of the micro blog. An expanded function of the micro blog is called "passing through". For example, when a user views a micro blog issuing a message that the whole of Wuhan city is filled with smoke due to a chemical factory exploding, if the user wants to learn more information to see whether there are other people talking about this event near the message of the micro blog, then he can click a point of interest loaded by the message of the micro blog and "pass through" a message aggregating page displaying more messages from the neighborhoods of the point of interest. Furthermore, for example, if the user views that the point of interest of a micro blog message is an ancient town of "Fenghuang", and the user just then plans to travel in "Fenghuang", then he can click the point of interest to "pass through" to view messages from neighborhoods of "Fenghuang" in a picture mode. Below, the disclosure is further described in detail in combination with the accompany drawings.

Figure 1:
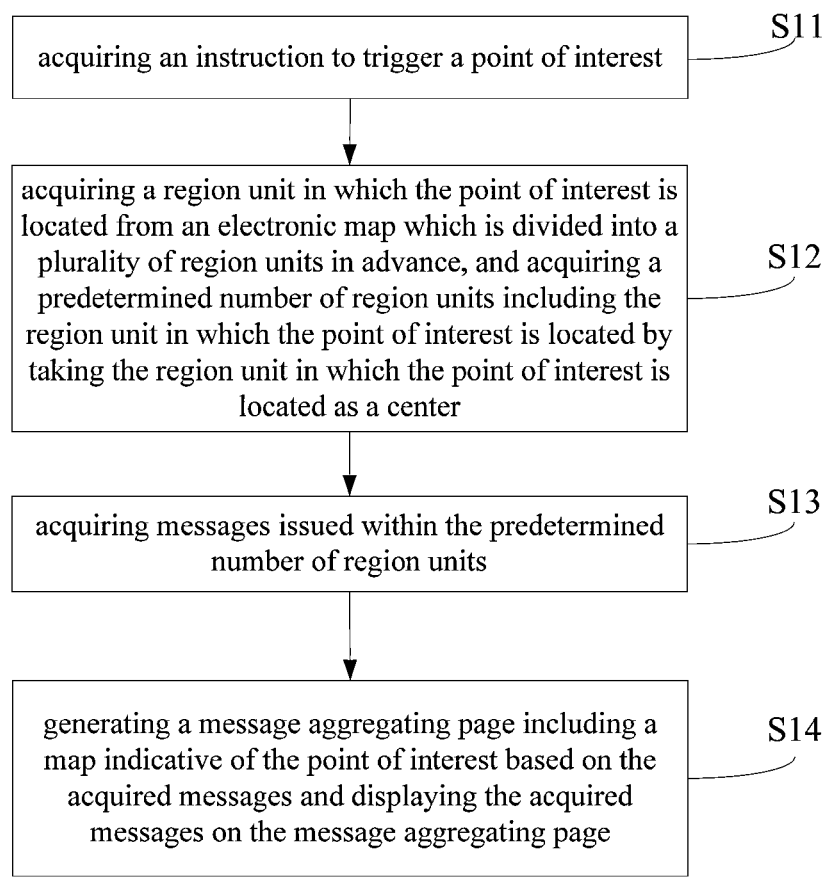
FIG. 1 is a flow diagram of a method for aggregating messages based on a point of interest in a first embodiment of the disclosure.

FIG. 1 is a flow diagram of a method for aggregating messages based on a point of interest provided by a first embodiment of the disclosure. As shown in FIG. 1, the method for aggregating messages based on a point of interest in the embodiment includes the following steps:

Step S11, an instruction to trigger a point of interest is acquired.

Figure 2:
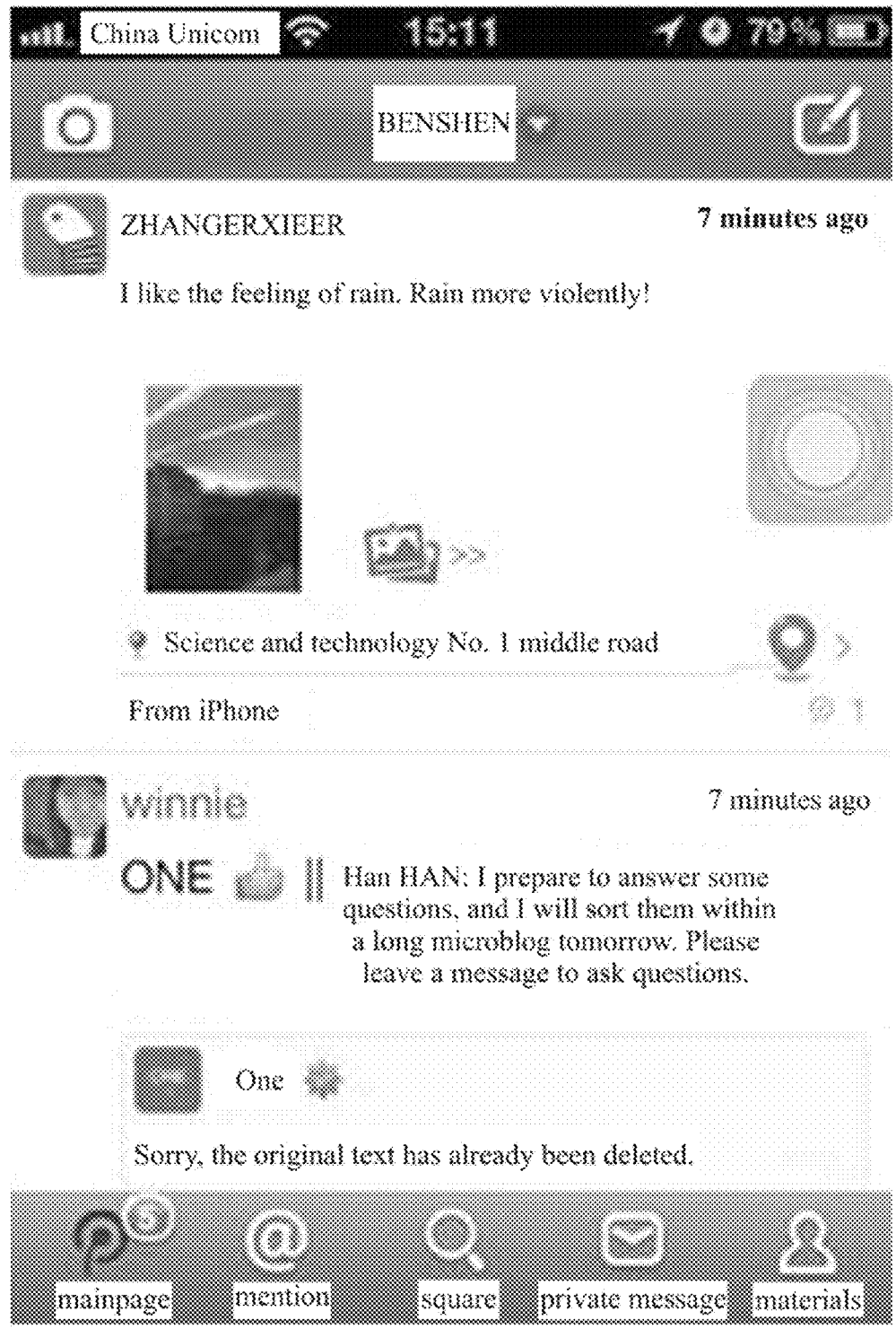
FIG. 2 is a micro blog message page in which information about the point of interest is loaded.

Usually, the point of interest is a landmark or position in a geographic region of a site such as a building, a road, a restaurant, a company and so on, which records at least latitude and longitude coordinates and can be stored in a database of an electronic map. Of course, the point of interest can also record its corresponding attributes such as its administrative division, category and so on. When the user of the micro blog loads information about the point of interest in a message issued by himself, the point of interest, for example, "Science and technology No. 1 middle road" shown in FIG. 2 is displayed on a message page of the micro blog along with the message. The system can enter subsequent steps upon acquiring the instruction to trigger the point of interest by clicking or selecting the point of interest.

Step S12, a region unit in which the point of interest is located is acquired from the electronic map which is divided into a plurality of region units in advance, and a predetermined number of region units including the region unit in which the point of interest is located are acquired by taking the region unit in which the point of interest is located as a center.

Figure 3:
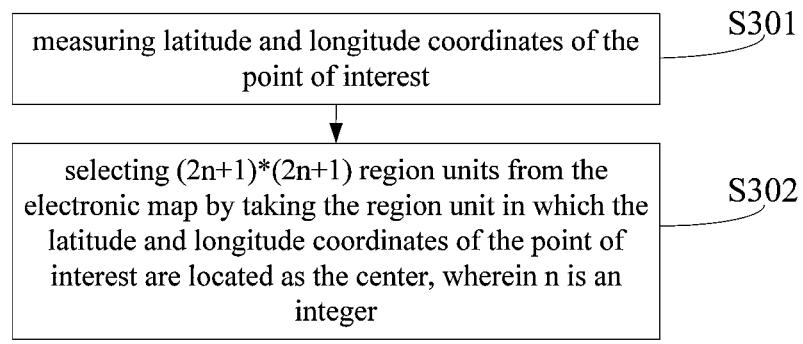
FIG. 3 is a specific flow diagram of a step S12 shown in FIG. 1.

As shown in FIG. 3, step S12 can further include the following steps:

Step S121, the latitude and longitude coordinates of the point of interest are measured.

Step 122, $(2n+1)*(2n+1)$ region units are selected from the electronic map by taking the region unit in which the latitude and longitude coordinates of the point of interest are located as the center, wherein n is an integer. For example, the region units are square regions having an edge of 1 km, or circular regions having a radius of 1 km. Other lengths such as 2 km, 10 km and so on can also be selected, and the edge and the radius are actual distances calculated by the scale of the electronic map. For example, if n is 2, i.e. there are 25 region units, then the region unit in which the latitude and longitude coordinates of the point of interest are located is a center region unit of the 25 region units.

Step S13, messages issued within the predetermined number of region units are acquired.

Both messages carrying information about the point of interest per se and messages carrying information about neighborhoods of the point of interest can be returned from a micro blog server to a micro blog client of the user. So in step S13, the messages issued within for example, the above $(2n+1)*(2n+1)$ region units can be acquired.

Step S14, a message aggregating page including a map indicative of the point of interest is generated based on the acquired messages and the acquired messages are displayed on the message aggregating page.

Step S14 can further include: displaying the messages within the $(2n+1)*(2n+1)$ region units on the message aggregating page with a predetermined sequence.

The predetermined sequence is a chronological sequence from near to far, or an actual geographic distance sequence from near to far to the point of interest. In the embodiment, the predetermined sequence is to display messages from the point of interest per se and from the neighborhoods of the point of interest with the chronological sequence from near to far, or to firstly display messages from the point of interest per se in the 25 region units and secondly display messages from region units neighboring the region unit in which the point of interest is located, and so on.

Figure 4:
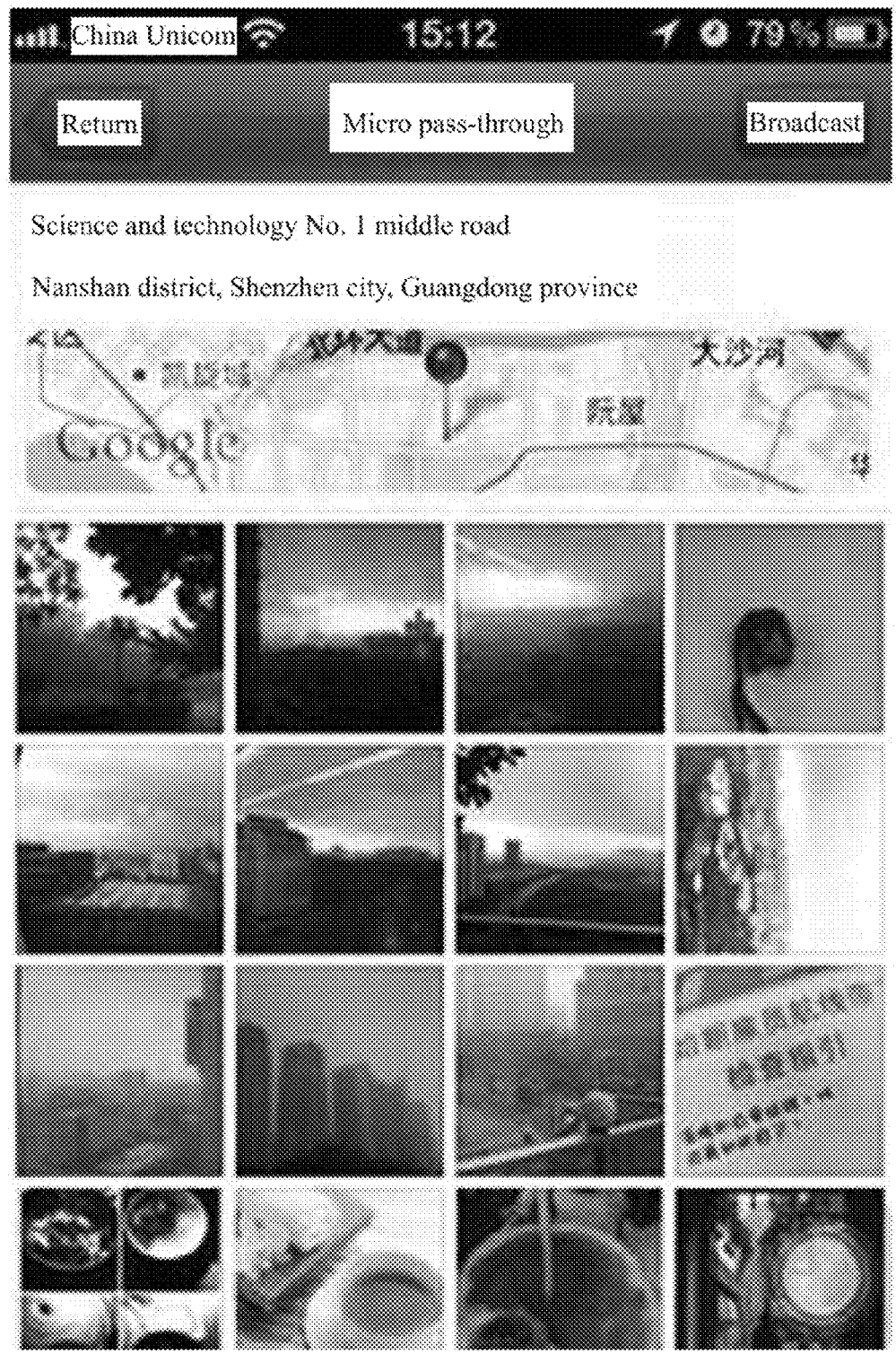
FIG. 4 is a micro blog page displaying messages with a picture mode.
Figure 5:
FIG. 5 is a micro blog page displaying messages with a word mode.

The messages can be displayed with the picture mode or a word mode. In the picture mode, pictures are abstracted from the ones containing a picture in the acquired messages and a plurality of the abstracted pictures are typeset and then displayed, as shown in FIG. 4. In the word mode, word information is abstracted from the acquired messages, and the messages are typeset and displayed with the word mode, as shown in FIG. 5. Preferably, in the message aggregating page, a display mode of transforming between the word mode and the picture mode is utilized. For example, a transforming trigger point is provided on the message aggregating page, the messages appear in the format of broadcast in the case that "broadcast" is selected, and the messages appear in the format of pictures in the case that "see pictures" is selected.

The method for aggregating messages based on a point of interest provided in the embodiment is mainly intended to solve the technical problem that traditional micro blog products lack an adequate capability of aggregating the messages based the point of interest, and thus can enlarge the message capacity of a micro blog and expand functions of the micro blog, which facilitate users more deeply interacting with each other and more quickly learning local information in real time.

Figure 6:
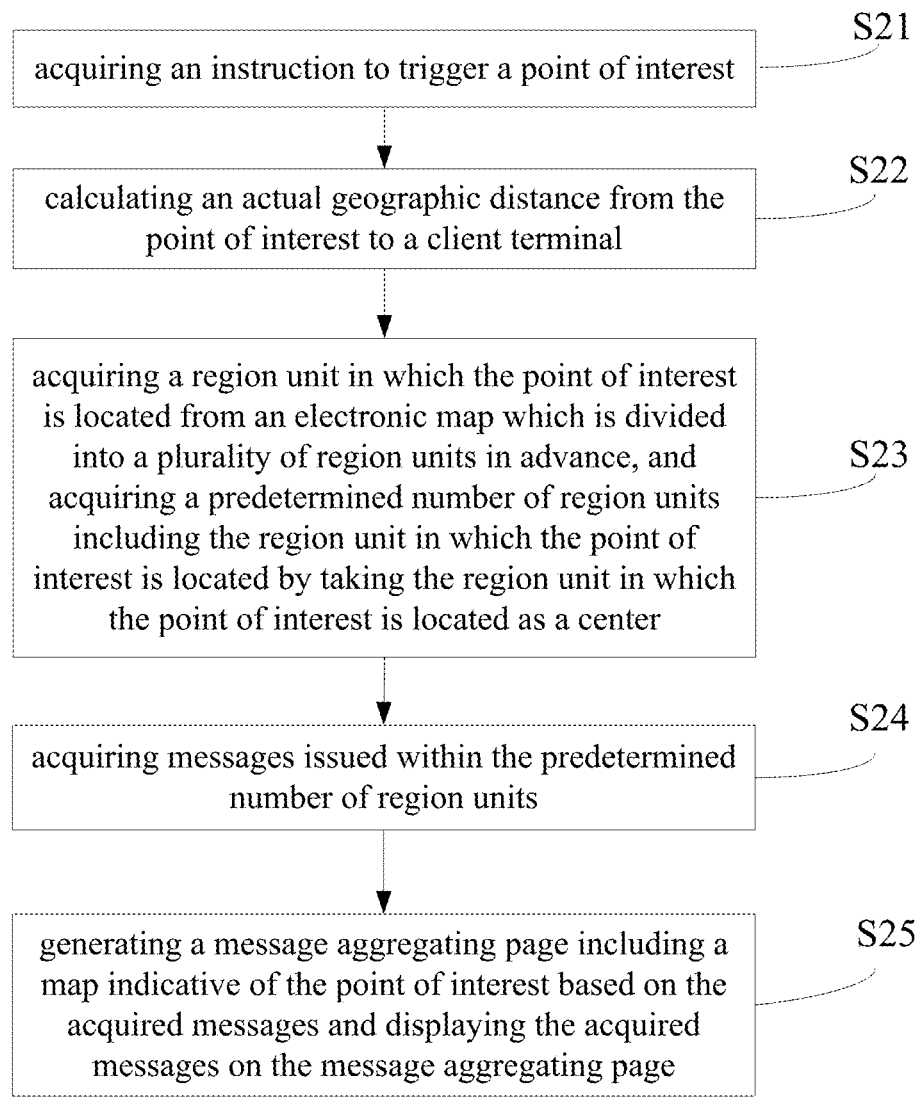
FIG. 6 is a flow diagram of a method for aggregating messages based on a point of interest in a second embodiment of the disclosure.

FIG. 6 is a flow diagram of a method for aggregating messages based on a point of interest provided by a second embodiment of the disclosure. As shown in FIG. 6, the method for aggregating messages based on a point of interest in the embodiment includes the following steps:

Step S21, an instruction to trigger a point of interest is acquired. This step is the same as step S11 in the first embodiment, and thus will not be redundantly described.

Step S22, an actual geographic distance from the point of interest to a client terminal is calculated.

Each point of interest has latitude and longitude coordinates and the position of the user itself (i.e. the position of the client terminal) have latitude and longitude coordinates. The geographical distance from the point of interest to the user can be calculated by calculating a route between coordinates of them. The geographical distance is a geographic distance reachable by public transport or by walking, rather than a direct line distance.

Step S23, a region unit in which the point of interest is located is acquired from an electronic map which is divided into a plurality of region units in advance, and a predetermined number of region units including the region unit in which the point of interest is located are acquired by taking the region unit in which the point of interest is located as a center. This step is the same as step S12 in the first embodiment, and thus will not be redundantly described.

Step S24, messages issued within the predetermined number of region units are acquired. This step is the same as step S13 in the first embodiment, and thus will not be redundantly described.

Step S25, a message aggregating page including a map indicative of the point of interest is generated based on the acquired messages and the acquired messages and the actual geographical distance from the point of interest to the client terminal are displayed on the message aggregating page.

Figure 7:
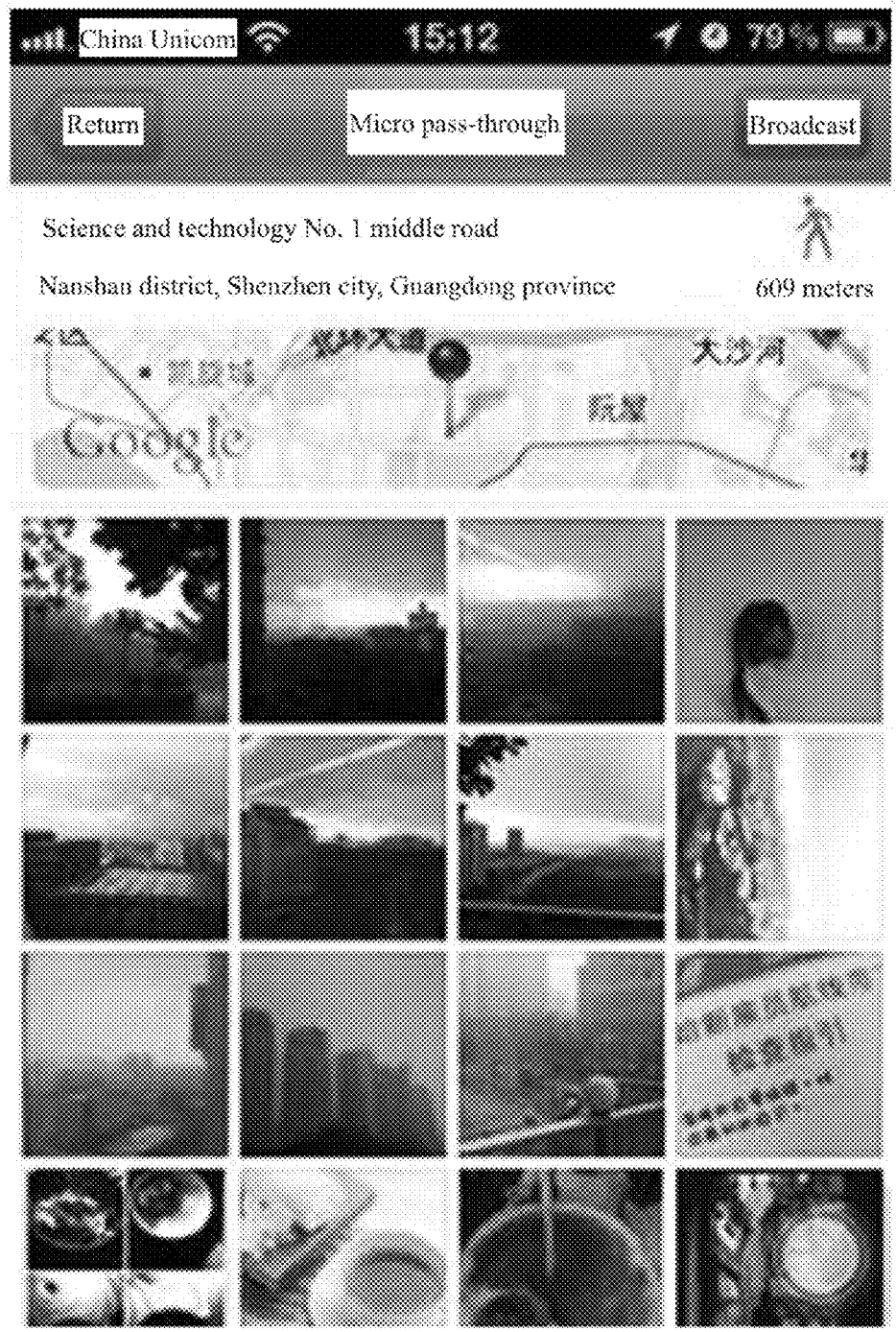
FIG. 7 is a micro blog page displaying an actual geographic distance from the point of interest to a client terminal.

In step S25, the actual geographical distance from the point of interest to the client terminal can be displayed on the message aggregating page by presenting an electronic map, as shown in FIG. 7.

The method for aggregating messages based on a point of interest provided in the embodiment is intended to solve the technical problem that traditional micro blog products lack an adequate capability of aggregating messages based a point of interest, and thus can enlarge the message capacity of a micro blog and expand functions of the micro blog, which facilitate users more deeply interacting with each other and more quickly learning local information in real time.

Figure 8:
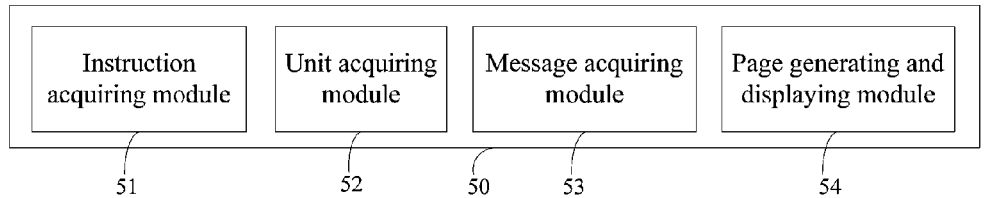
FIG. 8 is a structure diagram of a system for aggregating messages based on a point of interest in a third embodiment of the disclosure.

As shown in FIG. 8, a system for aggregating messages based on a point of interest, which is configured to implement the above method for aggregating messages based on a point of interest, is provided in a third embodiment of the invention. The system 50 includes an instruction acquiring module 51, a unit acquiring module 52, a message acquiring module 53 and a page generating and displaying module 54. The instruction acquiring module 51 is configured to acquire an instruction to trigger a point of interest. The unit acquiring module 52 is configured to acquire a region unit in which the point of interest is located from an electronic map which is divided into a plurality of region units in advance, and acquire a predetermined number of region units including the region unit in which the point of interest is located by taking the region unit in which the point of interest is located as a center. The message acquiring module 53 is configured to acquire messages issued within the predetermined number of region units. The page generating and displaying module 54 is configured to generate a message aggregating page including a map indicative of the point of interest based on the acquired messages and display the acquired messages on the message aggregating page.

Figure 9:
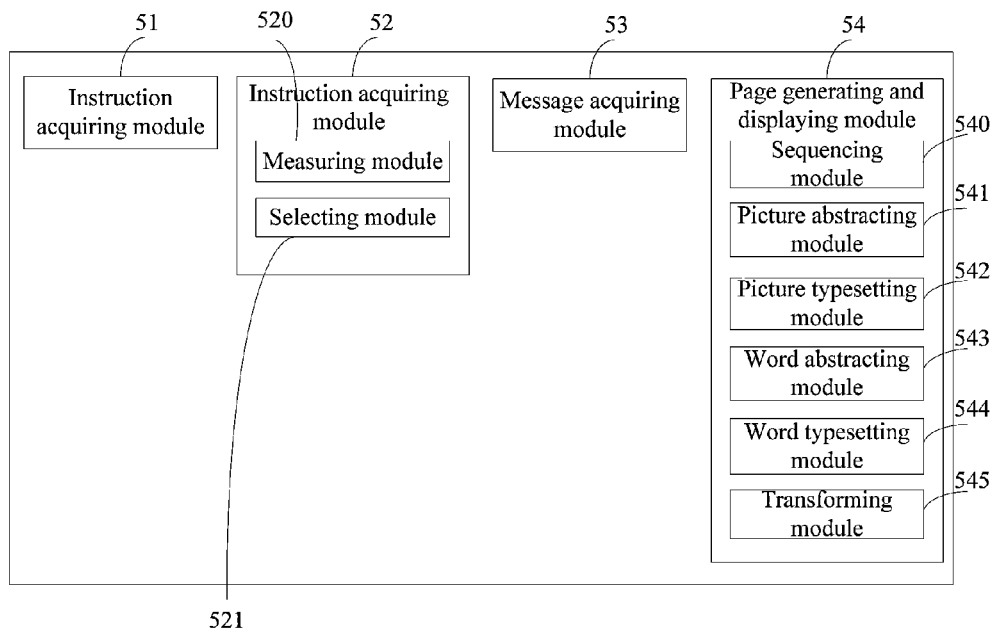
FIG. 9 is a specific structure diagram of the system shown in FIG. 8.

Preferably, as shown in FIG. 9, the unit acquiring module 52 includes a measuring module 520 and a selecting module 521. The measuring module 520 is configured to measure latitude and longitude coordinates of the point of interest. The selecting module 521 is configured to select (2n+1)*(2n+1) region units from the electronic map by taking the region unit in which the altitude and longitude coordinates of the point of interest are located as the center, wherein n is an integer.

The page generating and displaying module 54 includes an sequencing module 540 configured to sequence the messages within the (2n+1)*(2n+1) region units with a predetermined sequence.

The predetermined sequence can be a chronological sequence in which messages from the point of interest per se and neighborhoods of the point of interest are displayed chronologically from near to far, or an sequence that the messages from the point of interest per se are displayed firstly, and then messages from the neighborhoods of the point of interest are displayed, and so on.

Preferably, the page generating and displaying module 54 further includes a picture abstracting module 541 and a picture typesetting module 542. The picture abstracting module 541 is configured to abstract pictures from the ones containing a picture in the acquired messages, and the picture typesetting module 542 is configured to typeset a plurality of the abstracted pictures.

Preferably, the page generating and displaying module 54 further includes a word abstracting module 543 and a word typesetting module 544. The word abstracting module 543 is configured to abstract word information from the acquired messages, and the word typesetting module 544 is configured for typeset the messages in a word mode.

Preferably, the page generating and displaying module 54 further includes a transforming module 545 configured to transform the display mode of the messages between the word mode and a picture mode.

The system for aggregating messages based on a point of interest provided in the embodiment is intended to solve the technical problem that traditional micro blog products lack an adequate capability of aggregating messages based on the point of interest, and thus can enlarge the message capacity of a micro blog and expand functions of the micro blog, which facilitate users more deeply interacting with each other and more quickly learning local information in real time.

Figure 10:
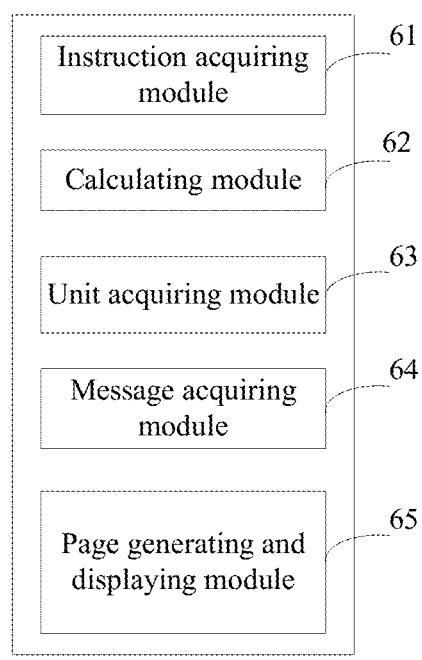
FIG. 10 is a structure diagram of a system for aggregating messages based on a point of interest in a fourth embodiment of the disclosure.

As shown in FIG. 10, a system for aggregating messages based on a point of interest, which is configured to implement the method for aggregating messages based on a point of interest, is provided in a fourth embodiment of the invention. The system 60 includes an instruction acquiring module 61, a calculating module 62, a unit acquiring module 63, a message acquiring module 64 and a page generating and displaying module 65. Similar to the third embodiment of the disclosure, the instruction acquiring module 61 is configured to acquire an instruction to trigger a point of interest, the unit acquiring module 63 is configured to acquire a region unit in which a point of interest is located from an electronic map which is divided into a plurality of region units in advance, and acquire a predetermined number of region units including the region unit in which the point of interest is located by taking the region unit in which the point of interest is located as a center, and the message acquiring module 64 is configured to acquire messages issued within the predetermined number of region units, which are not redundantly described herein. In the embodiment, the calculating module 62 is configured to calculate an actual geographic distance from the point of interest to a client terminal. The page generating and displaying module 64 is configured to generate a message aggregating page including a map indicative of the point of interest based on the acquired messages and display the acquired messages and the actual geographic distance from the point of interest to the client terminal on the message aggregating page.

The system for aggregating messages based on a point of interest provided in the embodiment is intended to solve the technical problem that traditional micro blog products lack an adequate capability of aggregating messages based on the point of interest, and thus can enlarge the message capacity of a micro blog and expand functions of the micro blog, which facilitate users more deeply interacting with each other and more quickly learning local information in real time.

To sum up, the methods and systems for aggregating messages based on a point of interest provided in the disclosure can enter the message aggregating page by triggering the point of interest, acquire more messages from neighborhoods of the point of interest, and thus enlarge the message capacity of the micro blog and expand functions of the micro blog.

The methods and apparatuses provided by the embodiments of the disclosure can be implemented by hardware, computer readable instructions, or the combination of hardware and computer readable instructions. The computer readable instructions employed in the embodiments are stored in a readable storage medium by multiple processors, wherein the readable storage medium is, for example a CD-ROM, a DVD, an optical disk, a soft disk, a magnetic tape, a RAM, a ROM, or another suitable storage device. Alternatively, at least a part of the computer readable instructions can be replaced by a specific hardware, for example, a custom integrated circuit, a gate array, a FPGA, a PLD, a computer having a specific function and so son.

An embodiment of the disclosure provides a computer readable storage medium configured to store instructions enabling a computer to implement the methods described herein. Specifically, the system or device provided by the embodiment includes a storage medium storing computer readable program codes for implementing functions of any one of the above embodiments, and the system or device (or CPU or MPU) is capable of reading and executing the program codes stored in the storage medium.

In this case, the computer codes read from the storage medium can implement any one of the above embodiments, and the program codes and the storage medium storing the instruction codes are a part of the technical solution.

The storage medium for providing the program codes include a soft disk, a hard disk, a magnetic-optical disk, an optical disk (for example, CD-ROM, CD-R, CD-RW, DVD-ROM, DVD-RAM, DVD-RW, DVD+RW), a magnetic disk, a flash card, a ROM and so on. Optionally, the program codes can also downloaded from a server computer via a communication network.

It should be noted that for the program codes executed by the computer, at least a part of operations implemented by the program codes can be implemented by an operating system on the computer to implement the technical solution of any one of the above embodiments, wherein the computer executes instructions based on the program codes.

Furthermore, the program codes in the storage medium are written in a memory, wherein the memory is located in an extension plate inserted in the computer, or an extension unit connected to the computer. In the embodiment, CPU in the extension plate or the extension unit executes at least a part of operations based on the program codes to implement the technical solution of any one of the embodiments.

What is claimed is:

1. A method for aggregating messages based on a point of interest, comprising:
    acquiring an instruction to trigger a point of interest loaded to a micro-blog message, wherein the point of interest is stored within an electronic map;
    acquiring a region unit in which the point of interest is located from the electronic map which is divided into a plurality of region units in advance, and acquiring a predetermined number of region units including the region unit in which the point of interest is located by taking the region unit in which the point of interest is located as a center;
    acquiring the micro-blog messages issued within the predetermined number of region units; and
    generating a message aggregating page including a map indicative of the point of interest based on the acquired micro-blog messages and displaying the acquired micro-blog messages on the message aggregating page.

2. The method for aggregating messages of claim 1, after the step of acquiring the instruction to trigger the point of interest, further comprising:
    calculating an actual geographic distance from the point of interest to a client terminal, wherein the message aggregating page further displays the actual geographic distance from the point of interest to the client terminal.

3. The method for aggregating messages of claim 1, wherein the step of acquiring the region unit in which the point of interest is located and the predetermined number of region units comprises:
    measuring latitude and longitude coordinates of the point of interest; and
    selecting $(2n+1)*(2n+1)$ region units from the electronic map by taking the region unit in which the latitude and longitude coordinates of the point of interest are located as the center, wherein n is an integer.

4. The method for aggregating messages of claim 3, wherein the step of acquiring the messages issued within the predetermined number of region units comprises:
    acquiring messages issued within the $(2n+1)*(2n+1)$ region units.

5. The method for aggregating messages of claim 4, wherein the step of displaying the acquired messages on the message aggregating page comprises:
    displaying the messages issued within the $(2n+1)*(2n+1)$ region units on the message aggregating page with a predetermined sequence.

6. The method for aggregating messages of claim 5, wherein the predetermined sequence is a chronological sequence from near to far.

7. The method for aggregating messages of claim 5, wherein the predetermined sequence is an actual geographic distance sequence from near to far to the point of interest.

8. The method for aggregating messages of claim 1, wherein pictures are abstracted from the ones containing a picture in the acquired messages and a plurality of the abstracted pictures are typeset and then displayed.

9. The method for aggregating messages of claim 1, wherein word information is abstracted from the acquired messages and the messages are typeset and then displayed with a word mode.

10. The method for aggregating messages of claim 1, wherein the message aggregating page displays the acquired messages with the following mode: transforming the display mode of the messages between a word mode and a picture mode.

11. A system for aggregating messages based on a point of interest, comprising:
    an instruction acquiring module configured to acquire an instruction to trigger a point of interest loaded to a Micro blog message, wherein the point of interest is stored within an electronic map;
    a unit acquiring module configured to acquire a region unit in which the point of interest is located from the electronic map which is divided into a plurality of region units in advance, and acquire a predetermined number of region units including the region unit in which the point of interest is located by taking the region unit in which the point of interest is located as a center;
    a message acquiring module configured to acquire the micro-blog messages issued within the predetermined number of region units; and
    a page generating and displaying module configured to generate a message aggregating page including a map indicative of the point of interest based on the acquired micro-blog messages and displaying the acquired micro-blog messages on the message aggregating page.

12. The system for aggregating messages of claim 11, further comprising:
a calculating module configured to calculate an actual geographic distance from the point of interest to a client terminal, wherein the message aggregating page further displays the actual geographic distance from the point of interest to the client terminal.

13. The system for aggregating messages of claim 11, wherein the unit acquiring module comprises:
a measuring module configured to measure latitude and longitude coordinates of the point of interest; and
a selecting module configured to select (2n+1)*(2n+1) region units from the electronic map by taking the region unit in which the latitude and longitude coordinates of the point of interest are located as the center, wherein n is an integer.

14. The system for aggregating messages of claim 11, wherein the page generating and displaying module comprises an sequencing module configured to sequence messages within the (2n+1)*(2n+1) region units with a predetermined sequence.

15. The system for aggregating messages of claim 11, wherein the page generating and displaying module comprises:
a picture abstracting module configured to abstract pictures from the ones containing a picture in the acquired messages; and
a picture typesetting module configured to typeset a plurality of the abstracted pictures.

16. The system for aggregating messages of claim 11, wherein the page generating and displaying module comprises:
a word abstracting module configured to abstract word information from the acquired messages; and
a word typesetting module configured to typeset the messages with a word mode.

17. The system for aggregating messages of claim 11, wherein the page generating and displaying module comprises:
a transforming module configured to transform the display mode of the messages between a word mode and a picture mode.

18. A non-transitory storage medium storing computer executable instructions, which enable a computer to implement operations of:
acquiring an instruction to trigger a point of interest loaded to a Micro blog message, wherein the point of interest is stored within an electronic map;
acquiring a region unit in which the point of interest is located from the electronic map which is divided into a plurality of region units in advance, and acquiring a predetermined number of region units including the region unit in which the point of interest is located by taking the region unit in which the point of interest is located as a center;
acquiring the micro-blog messages issued within the predetermined number of region units; and
generating a message aggregating page including a map indicative of the point of interest based on the acquired micro-blog messages and displaying the acquired micro-blog messages on the message aggregating page.

19. The non-transitory storage medium of claim 18, after the step of acquiring the instruction to trigger the point of interest, further comprising:
calculating an actual geographic distance from the point of interest to a client terminal, wherein the message aggregating page further displays the actual geographic distance from the point of interest to the client terminal.

20. The non-transitory storage medium of claim 18, wherein the step of acquiring the region unit in which the point of interest is located and the predetermined number of region units comprises:
measuring latitude and longitude coordinates of the point of interest; and
selecting (2n+1)*(2n+1) region units from the electronic map by taking the region unit in which the latitude and longitude coordinates of the point of interest are located as the center, wherein n is an integer.

* * * * *